United States Patent [19]

Hassell

[11] 4,111,222
[45] Sep. 5, 1978

[54] ADJUSTMENT LIMITER IN A COMPRESSED GAS PRESSURE REGULATOR

[75] Inventor: David Allen Hassell, Coon Rapids, Minn.

[73] Assignee: The Cornelius Company, St. Louis Park, Minn.

[21] Appl. No.: 708,433

[22] Filed: Jul. 26, 1976

[51] Int. Cl.² ............................................. F16K 13/04
[52] U.S. Cl. .................................. 137/69; 137/116.5; 137/505.42
[58] Field of Search ........... 137/116.5, 505.26, 505.41, 137/505.42, 505, 69

[56] References Cited

U.S. PATENT DOCUMENTS

| 1,190,514 | 7/1916 | Cash | 137/505.42 |
| 1,946,188 | 2/1934 | Birch | 137/505.41 |
| 2,981,280 | 4/1961 | Cornelius | 137/505.26 |
| 3,911,947 | 10/1975 | Boxall | 137/505.42 X |

Primary Examiner—Harold W. Weakley
Attorney, Agent, or Firm—Henry C. Kovar

[57] ABSTRACT

An adjustable compressed gas pressure regulator of the diaphragm and spring type has a spring seat mounted between the spring and the adjuster and the regulator body has a limit stop to engage and stop adjustment displacement of the spring seat prior to complete compression of the spring.

3 Claims, 2 Drawing Figures

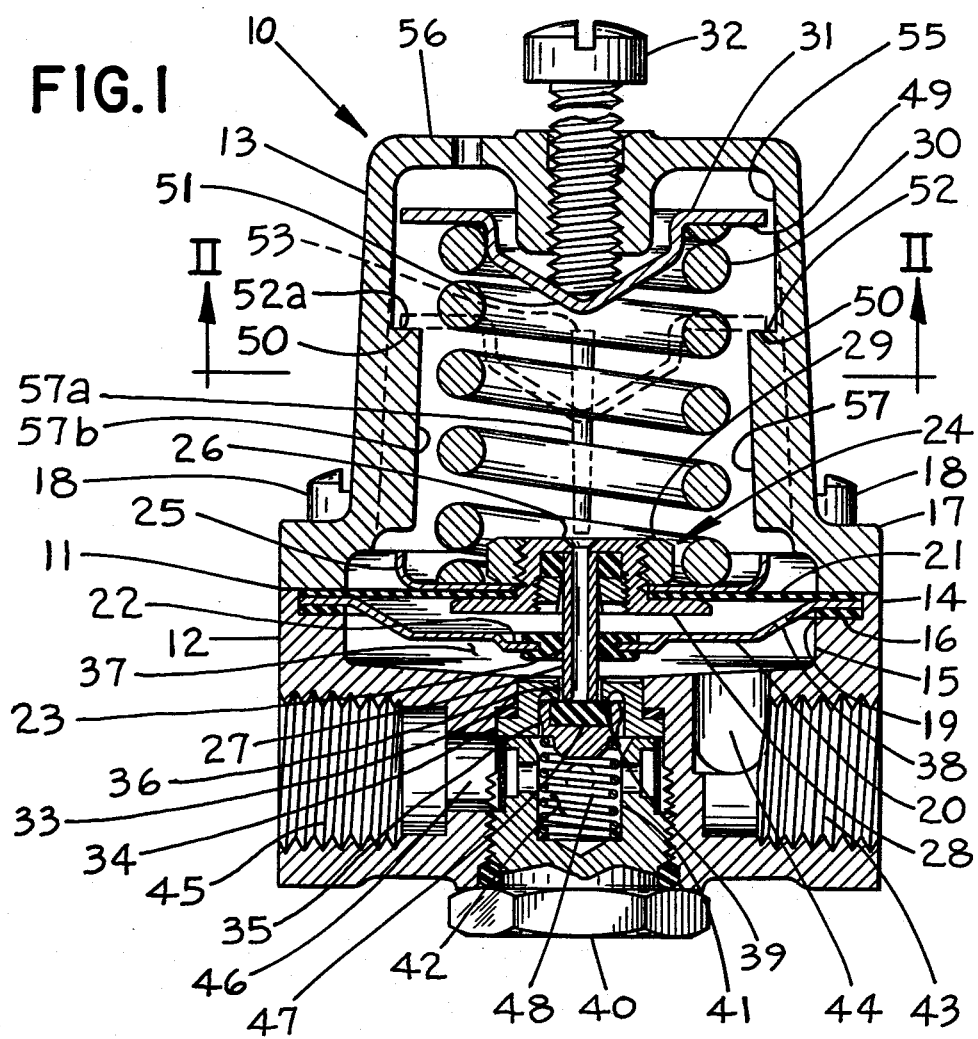
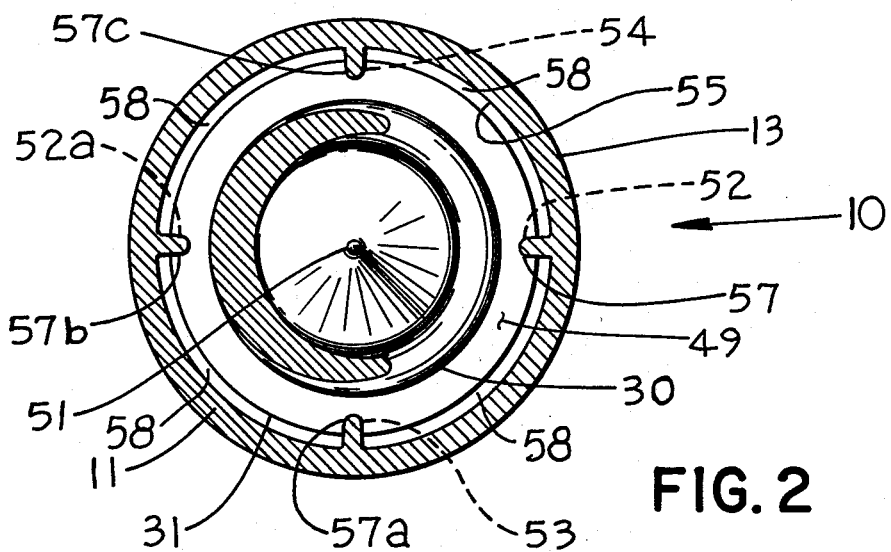

ADJUSTMENT LIMITER IN A COMPRESSED GAS PRESSURE REGULATOR

BACKGROUND OF THE INVENTION

1. Field of the Invention

This invention pertains to a compressed gas pressure regulator having an adjustment limiter.

2. Prior Art

The prior device is disclosed and fully described in R. T. Cornelius U.S. Pat. No. 2,981,280 of Apr. 25, 1961. This regulator has been extremely successful in commerce and is widely used by retailers of soft drinks and beer throughout the United States and other countries of the world. The regulator is typically used on metal bottles of high pressure carbon dioxide which have a bottle or supply pressure in the range of 700 to 1200 PSI at normal ambient temperatures. The regulator has been made in several models; for example, it has been made available in low pressure, medium pressure and high pressure variations. A typical low pressure regulator will be intended for beer and have an adjustable regulatable output pressure range of 0-60 PSIG; a medium pressure regulator for carbonation of cold soft drinks will have an adjustable regulatable output pressure range of 0-100 PSIG; and a high pressure regulator for carbonation of a warm soft drink supply will have a regulatable output pressure range of 0-160 PSIG.

It will be appreciated that beverage retailers hire many part-time and relatively untrained employees; many times they will be students or people working part-time on weekends or evenings. For the most part these people are insufficiently trained or not knowledgeable in the precautions required in the handling of compressed gases. Many times the retailer and/or his employee will completely ignore the instructions given with respect to the usage of compressed gas equipment.

The problem that has arisen is that the user of the regulator will attempt to adjust the regulator to give an output or regulated pressure in excess of what the device was intended for. The easiest way for these people to do this has been to go to a toolbox and get a longer screw than the adjusting screw supplied with the regulator and to install this longer screw and then excessively compress the spring to attain a higher output pressure. The extreme example is substitution of a hex head cap screw and usage of a wrench to tighten the cap screw down on the spring.

It is a normal and accepted commercial practice to manufacture and sell regulators with an adjusting screw precisely of the right length so that it is impossible to bottom out or compress the spring to solid height. However, regulator owners and/or users remove the manufacturer's adjusting screws and substitute their own screws. Further, it is an accepted commercial practice to provide an external lock nut on a pressure adjusting screw precisely as is shown in U.S. Pat. No. 2,981,280 and in fact this construction is presently specified by the dominant and largest soft drink company in the world as an equipment standard for its bottlers to comply to. With this construction the owner/user will many times remove the lock nut, thereby increasing the effective length of the adjusting screw to a length enabling solid compression of the diaphragm spring. It will be apparent that it is in pure defiance of common sense that individuals change the construction of the adjusting screw as they see fit.

The most serious result of this practice is that the pressure spring is collapsed to its solid height and the regulator valve is held open and cannot close because the spring no longer functions. Further, the relief function of the regulator in U.S. Pat. No. 2,981,280 will no longer operate because the valve stem is positively retained against the valve and the relief port cannot open. When the pressure regulator valve is held open, the full pressure of the supply bottle is applied to the beverage dispensing system. The typical beverage system has a working pressure in the range of 25-150 PSIG and the application of approximately 1,000 PSI results in a bursting of the equipment. This problem is aggravated by regulator users and owners who do not replace damaged or inoperative pressure gauges and therefore the indicator dials are inaccurate or do not work at all. As an example, if a user has an almost empty gas bottle, he may excessively tighten the adjustment screw and hold open the regulator valve. The proper output pressure would still not be attained because the bottle pressure is almost depleted. The regulator user then puts the regulator on a new bottle, forgets to back off the regulator adjustment and opens the master on-off valve on the gas bottle. The full bottle pressure is applied to the dispensing system and the system bursts at one of its weakest points. The result at the very best is a horrible mess with beverage blown over the area immediate to the bursting. More serious is the economic damage and most serious would be personal injury.

Another situation is where the gas bottle goes empty and the regulator user, in attempting to get the desired output pressure, bottoms out the spring and opens the regulator valve. The beverage, be it soft drinks or beer, can then backflow through the regulator and into the gas bottle. Obviously, the gas bottle is then contaminated and the life expectancy of the bottle may be reduced due to corrosion from the contaminants.

OBJECTS OF THE PRESENT INVENTION

Accordingly, it is an object of the present invention to provide a gas pressure regulator which has a limiting device for controlling the extent of adjustability for pressure.

It is an object of the present invention to provide a regulator which will give a positive indication of attempted adjustment to an excessively high output pressure.

It is another object of the present invention to provide a regulator having a pressure limiter of economical configuration.

It is a further object of the present invention to provide an improvement in the limitation of over pressurization for an existing and known regulator.

It is yet a further object of this invention to provide a pressure limiter which can be retrofitted on a known regulator.

Many other advantages, features and additional objects of the present invention will become manifest to those versed in the art upon making reference to the detailed description and accompanying drawings in which a preferred structural embodiment incorporating the principles of the present invention is shown by way of illustrative example.

SUMMARY OF THE INVENTION

In accordance with the principles of this invention, a compressed gas pressure regulator having a diaphragm and spring for biasing the diaphragm to open a pressure control valve is provided with a spring seat positioned between the spring and an adjustment device with the spring seat having a margin extending outward beyond the spring, and the regulator body has a limit stop for engaging the spring seat and terminating travel and adjustment of the spring seat prior to complete compression of the diaphragm spring.

ON THE DRAWINGS

FIG. 1 is a longitudinal elevational sectional view of the preferred structural embodiment of an adjustment limiter in a compressed gas regulator, provided in accordance with the principles of the present invention; and FIG. 2 is an upward looking sectional view taken through lines II—II in the structure and view of FIG. 1.

AS SHOWN ON THE DRAWINGS

The principles of the present invention are particularly useful when embodied in a compressed gas pressure regulator of the type illustrated in FIG. 1 and generally indicated by the numeral 10.

The regulator 10 includes a regulator body 11 having a valve base 12 and a cover 13. The base 12 is constructed with an outward extending flange 14 and a depression 15 which extends through the flange 14 and into the base 12. The depression 14 terminates in an annular rabbet 16 at the upper portion of the base 12. Overlying the flange 14 is a cup-shaped cover 13 which has a flange 17 overlying the base flange 14 and which is secured to the base 12 by means of fastener screws 18 which pass through the cover flange 17 and are screwed into tapped holes in the base flange 14. Extending across the depression 15 and into the rabbet 16 is a gasket 19, a plate 20 and a diaphragm 21. The diaphragm 21 is made of rubber or some other similar flexible material and the plate 20 is preferably made of metal. The plate 20 is dish-shaped in form and has an offset center portion 22 with an opening 23 extending therethrough. These various parts are tightly clamped between the base flange 14 and the cover flange 17 for holding the parts in an operative and assembled relation.

The diaphragm 21 has attached to it a mounting, generally indicated by the numeral 24, which includes a spring plate 25 and means or structure 26 for engaging a valve stem 27. In the embodiment shown, the engager means 26 includes a threaded bushing 28 extending through an opening in the diaphragm 21 and the spring plate 25. A nut 29 screwed onto the bushing 28 serves to clamp the mounting 24 to the diaphragm 21.

A spring 30, which is shown as being of a cylindrical helical coil compression type, is mounted within regulator body 11 and has one end seated against the spring plate 25 and the other end against a spring seat 31 which, together with the spring 30, is positioned inside of the cover 13. Adjusting means 32, such as the illustrated screw as shown, is provided for positioning the spring seat 31 tightly against the spring 30 and for partially compressing the spring 30 for biasing the mounting 24 and diaphragm 21 in one direction. The adjusting means 32 is variably adjustable in position for varying the position of the spring seat 31 and therefore the partial compression of the spring 30.

The valve base 12 has a bore 33 in which is mounted a flanged bushing 34 having a bore 35 therein and a passageway 36 communicating therewith. The depression 15 in valve base 12 forms a pressure chamber 37. The plate 20 extends through pressure chamber 37 and upper and lower portions of this pressure chamber 37 are brought into communication by a gas aperture 38 in the plate 20. The passageway 36 in the bushing 34 also communicates with the pressure chamber 37 and is encircled by an annular valve seat 39. The bushing 34 is held in place within the bore 33 by means of a cap 40 which is screwed into the lower end of the base 12 and which compressively engages the bushing 34. The cap 40 has a bore 41 lying in continuation of the bore 35. The bores 35 and 41 form a valve chamber 42. Formed in the valve base 12 is an outlet 43 which communicates through a passageway 44 with the pressure chamber 37. Also found in the valve base 12 is an inlet 45 which communicates with the valve chamber 42 through a passageway 46 in the valve body 12. Within the valve chamber 42 is mounted a valve head 47 which is operational to sealingly seat against the valve seat 39 and close the passageway 36 from the valve chamber 42 to the pressure chamber 37. A spring 48 mounted in the cap 40 engages the valve 47 and urges it against the valve seat 39.

Acting between and operatively connecting the mounting 24 and valve 47 is a valve stem or valve actuator 27. The valve stem 27 extends through the passageway 36 but as the valve stem 27 is a lesser diameter than the bore forming the passageway 36, the passageway 36 is open around the outside of the valve stem 27 for the passage of gas therethrough from valve chamber 42 to regulated pressure chamber 37.

The operation of the structure so far described is as follows: A source of unregulated high pressure gas, for example carbon dioxide, at a pressure in the range of 700 to 1200 PSI, or approximately 1000 PSI, is attached to the inlet 45. This gas and the pressure thereof is applied and present in the valve chamber 42. Initially, if the valve 47 is against the valve seat 39, the passageway 36 is closed. The adjustment means 32 is turned in and the spring seat 31 is forced into and against the spring 30, partially compressing the spring 30 and the force effected thereby is transmitted to the mounting 24 and to the diaphragm 21. The diaphragm 21 and mounting 24 move toward the valve 47 under the pressure of the spring 30 and during this movement the valve stem 27 is moved by the mounting 24. The valve stem 27 engages the valve 47 and forces the valve 47 off the valve seat 39. The passageway 36 is then open and high pressure gas flows through the passageway 36 into the pressure chamber 37. When the gas pressure within the pressure chamber 37 is sufficient to exert enough force on the diaphragm 21 to overcome the force of the spring 30, the diaphragm 21, mounting 24 and valve stem 27 all move in a direction away from the valve 47 and the valve 47 reseats against the valve seat 39 and the passageway 36 is closed. The pressure within the pressure chamber 37 is precisely regulatable by adjustment of the adjusting means 32.

The valve stem 27 is hollow and if the pressure in the pressure chamber 37 is excessive, the diaphragm 21, mounting 24 and valve stem 27 will be further forced upward against the spring 30 which will lift the valve stem 27 off of the valve 47 and the excess gas in pressure chamber 37 will pass backwards through the passageway 36 and vent through the hollow valve stem 27 and out of the cover 13 to atmosphere.

An important feature of the present invention is the provision of structure in the pressure regulator 10 for limiting the amount of compression of the spring 30 so that the spring 30 is never solidly compressed and so that the mounting 24, and diaphragm 21 are always movable, both for proper regulation of passage of gas from the valve chamber 42 to the pressure chamber 37 and for relief of any excess pressure within the pressure chamber 37.

Referring again to FIG. 1, the spring seat 31 will be seen as having an outer margin 49 which extends radially outward beyond the radial extremities of the spring 30. The adjusting means 32 is operable for displacing the spring seat 31 in a direction toward the mounting 24 and in a path and range of travel which will partially compress the spring 30 to a greater or lesser degree and therefore give a relatively high or low regulated pressure in the pressure chamber 37. There is a limit stop 50 which is mounted in the regulator body 11 and which is in the path of travel of the spring seat 31. The spring seat margin 49 is abuttable against the limit stop 50 when the spring seat 31 is displaced the maximum amount intended to be possible by the adjusting means 32. When the spring seat margin 49 is abutted against the limit stop 50 the spring 30 is not completely compressed to solid height and the mounting means 24 and diaphragm 21 are still movable toward the spring 30 for proper closing operation of the valve 47 against the valve seat 39 and also for proper operation of the pressure relief through the hollow valve stem 27.

The spring seat 31 has a center section 51 in engagement with the adjusting means 32. If the adjusting means 32 is driven further toward the mounting 24 with excessive force, an example of which would be turning a substituted longer screw with a wrench, the center section 51 of the spring seat 31 is rupturable and the adjusting means 32 will rupture through the spring seat center section 50 and the regulator 10 will in effect turn off and the regulated pressure will drop to almost zero as the spring seat 31 goes upward about the adjusting means 32. The spring seat 31 has a center section 51 which is of a lesser thickness of material than the thickness of the margin 49 and the spring seat 31 is preferably formed of a single piece of material such as soft metal. The relative rigidity of the margin 49 holds the spring seat 31 in position on the limit stop 50 and does not allow further compression of the spring 30 even while the spring seat center section 51 is under a force from the adjusting means 32 which is close to or sufficient to rupture the center section 51. The limit stop 50 is placed immediately adjacent to and outside of the spring 30 which gives a minimal conical deflection of the spring seat 31 in the event the adjusting means 32 is turned in or adjusted in excess of what is intended to be the normal range and this also helps in assuring that the spring 30 is not overly compressed.

The limit stop 50 may be formed of at least two individual abutments 52, 52a which are spaced from each other and would be on opposite sides of the spring 30 as shown. It has been found preferable to have a third abutment 53 because it is then impossible for a properly sized spring seat 31 to tip off of the limit stop 50. In the embodiment shown, as best seen in FIG. 2, there are provided four abutments 52, 52a, 53, and 54. The spring seat margin 49 extends uninterrupted around the entirety of the circumference of the spring seat 31 which gives maximum strength to the margin 49 and also assures that the margin 49 will engage all of the abutments 52, 52a, 53 and 54, which lie in a plane parallel to the diaphragm 21 so that when the spring seat 31 is abutted down against the limit stop 50, it is parallel to the diaphragm 21 and the spring 30 is not cocked or twisted.

The spring seat 31 is inside of a cylindrical section 55 of the regulator cover 13 and the cylindrical section 55 is covered solid by the top 56 and the limit stop 50 is obstructively in the way for installation and for removal of the spring seat 31 from the cover 13 after the cover 13 is removed from the regulator valve base 12. The regulator cover 13 is a casting, preferably of metal, and is cast with a rib 57 or plurality of ribs 57, 57a, 57b, 57c as shown, and as cast all of the ribs 57, 57a, 57b, 57c extend all the way to the cover top 56. That part of the rib 57, 57a, 57b, 57c in the cylindrical section 55 is removed and there remains a portion of each rib 57, 57a, 57b, 57c in the cover 13 with the upper surface or end of each respective remaining rib portion becoming a respective abutment 52, 53, 54 of limit stop 50. In the spacings between the ribs 57, 57a, 57b, 57c and abutments 52, 53, 54 there is provided accesses 58 which have a diameter greater than the interior diameter of the ribs 57, 57a, 57b, 57c or the outer circumference of the spring seat 13 and which are preferably at least as arcuately wide as the arcuate width of a rib 57 and which are shown to be much wider. The spring seat 31 can either be installed or removed into or from the cylindrical section 55 by turning the spring seat 31 on edge and sliding the then turned spring seat 31 into the cover 13 between the ribs 57, 57a, 57b, 57c and through the accesses 58 and then turning the spring seat 31 over into its normal mounted operating position as it enters the cylindrical section 55.

It has been found advantageous to have the regulator cover 13 fastenably removable from the regulator valve base 12 and to have the cover 13 carry the limit stop 50, adjusting means 32 and spring seat 31 with the margin 49 thereon. It will be apparent that this is an extremely simple and economical structure and does not require a costly external knob on the adjusting means. It has been found that this particular cover 13, adjusting means 32 and spring seat 31 will fit and operate interchangeably on the regulator of U.S. Pat. No. 2,981,280 in place of the original corresponding cover, adjusting means and spring seat of that regulator as shown and described in that patent. In use of this regulator, a retail beverage dealer will usually lease or rent the regulator from a bottling or brewery plant. While most bottling and brewery personnel are knowledgeable in pressure regulators, most retailers and hired employees of retailers are not. If the retailer or his employee forces the regulator beyond its intended pressure adjustment, the ruptured spring seat 31 will need replacement and the bottler, brewer and retailer will then know, or at least have indications, that corrective and remedial training of some worker may be needed to prevent repetition of such rupturement for avoidance of any type of accident with the compressed gas equipment and avoidance of any possible damage to the beverage equipment or the retail location per se.

Although various and minor modifications may be suggested by those versed in the art, it should be understood that I wish to embody within the scope of the patent warranted hereon, all such embodiments as reasonably and properly come within the scope of my contribution to the art.

I claim as my invention:

1. In a compressed gas pressure regulator having a regulator body, a diaphragm of flexible material carried thereby, a mounting carried by the diaphragm, a spring operatively positioned between the regulator body and the mounting, means mounted in the body and adjustably operative upon the spring for partially compressing the spring into operative engagement against the mounting for movably biasing the mounting and the diaphragm in one direction, a pressure chamber in the body and adjacent to the diaphragm, a valve chamber in the body, an inlet to the valve chamber and an outlet from the pressure chamber, a passageway connecting the pressure and valve chambers, a valve seat in the valve chamber spaced from the mounting and surrounding the passageway, a valve head in the valve chamber and adapted to sealingly seat against the valve seat and close the passageway, and means between the mounting and the valve head for unseating the valve head upon movement of the mounting and diaphragm in the direction as biased by the spring for opening the passageway, the improvement, comprising in combination therewith:

a. a spring seat mounted between the spring and the adjustment means, the spring seat being displaceable by the adjustment means through a path and range of travel for partially compressing the spring against the mounting;

b. an outer margin on the spring seat, the margin extending radially outward beyond the spring;

c. a limit stop mounted in the body and in the path of displaceable travel of the spring seat, the margin and limit stop being abuttable against each other prior to complete compression of the spring for terminating displacement of the spring seat and limiting compression of the spring; and d. a rupturable center section in the spring seat and in engagement with the adjusting means, the center section being rupturable upon operation of the adjustment means in a direction toward the mounting when the margin and limit stop are abutted against each other.

2. A regulator according to claim 1, in which the spring seat is formed of a single piece of material, and the center section is of a lesser thickness than the thickness of the margin.

3. In a compressed gas pressure regulator having a regulator body including a cover formed of a casting, a base fastenably attached to and removable from the cover, a diaphragm of flexible material carried by said base and said cover, a spring mounting plate carried by the diaphragm, a spring operatively positioned between the regulator body and the mounting plate, a top on the body cover, means mounted in the cover top and adjustably operative against the spring for partially compressing the spring into operative engagement against the mounting plate for movably biasing the mounting plate and the diaphragm in one direction, a pressure chamber in the body and adjacent to the diaphragm, a valve chamber in the body, an inlet to the valve chamber and an outlet from the pressure chamber, a passageway connecting the pressure and valve chambers, a valve seat in the valve chamber spaced from the mounting plate and surrounding the passageway, a valve head in the valve chamber and adapted to sealingly seat against the valve seat and close the passageway, and means operative between the mounting plate and valve head for unseating the valve head upon movement of the mounting plate and diaphragm in the direction as biased by the spring for opening the passageway, a spring seat mounted within the cover just under the cover top and between the spring and the adjustment means with said spring seat being displaceable by said adjustment means through a path and range of travel sufficient for partially compressing the spring against the mounting plate, an outer margin on the spring seat, with said margin extending radially outward beyond and completely around the entire circumference of the spring, and a limit stop in the body cover and in the path of displaceable travel of the spring seat with the spring seat margin and the limit stop being abuttable against each other prior to complete compression of the spring for terminating possible displacement of the spring seat and limiting compression of the spring, the improvement, comprising in combination therewith:

at least three individual internal straight elongate ribs cast integrally with and as part of the cover, said ribs being spaced radially from one another around the inside of the cover and around the outside of the spring and being positioned co-axially with the spring, said ribs as cast all being adjoined directly to the cover top and extending uninterruptedly from the cover top past the spring seat and spring and nearly to the spring mounting plate, each rib having that part of its as-cast self originally between the limit stop and the cover top removed from the casting such that there is only a portion of each of the as-cast rib remaining with an end formed on each remaining rib portion facing toward the cover top and the spring seat margin, all of such rib ends jointly forming said limit stop, and an access in a radial spacing between the ribs with the spring seat being installable into and removable from its operative position within the cover by passage through the access.

* * * * *